United States Patent Office 3,608,362
Patented Sept. 28, 1971

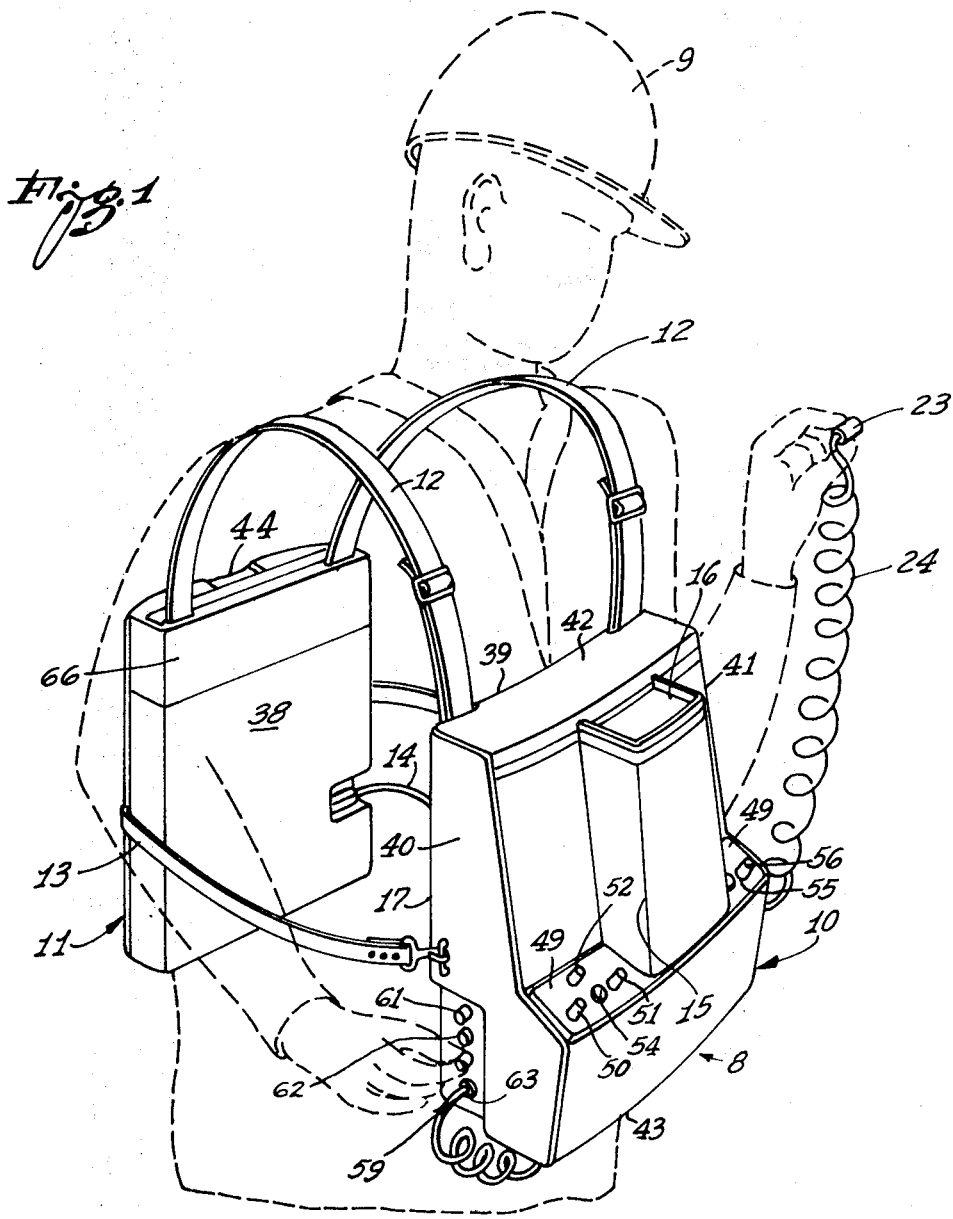

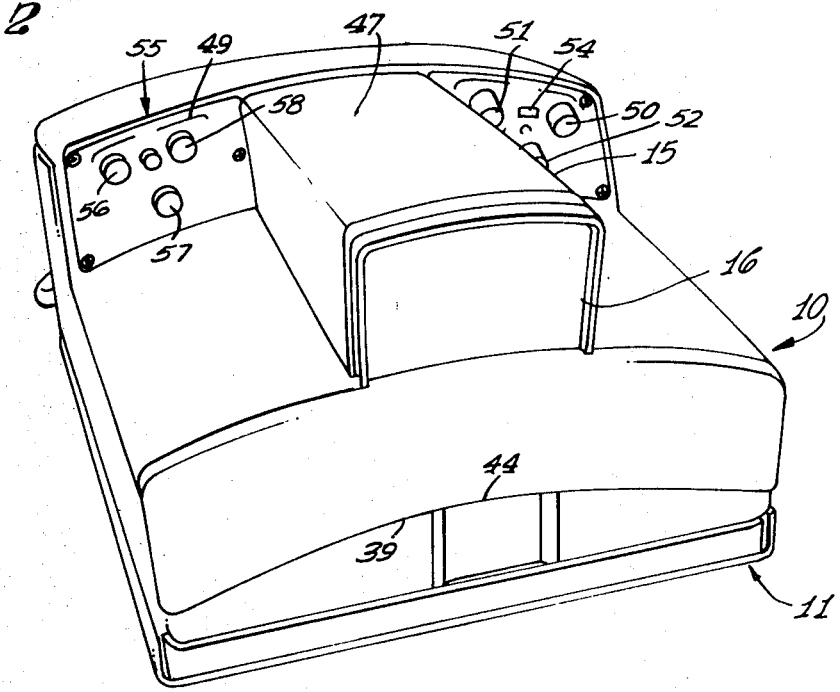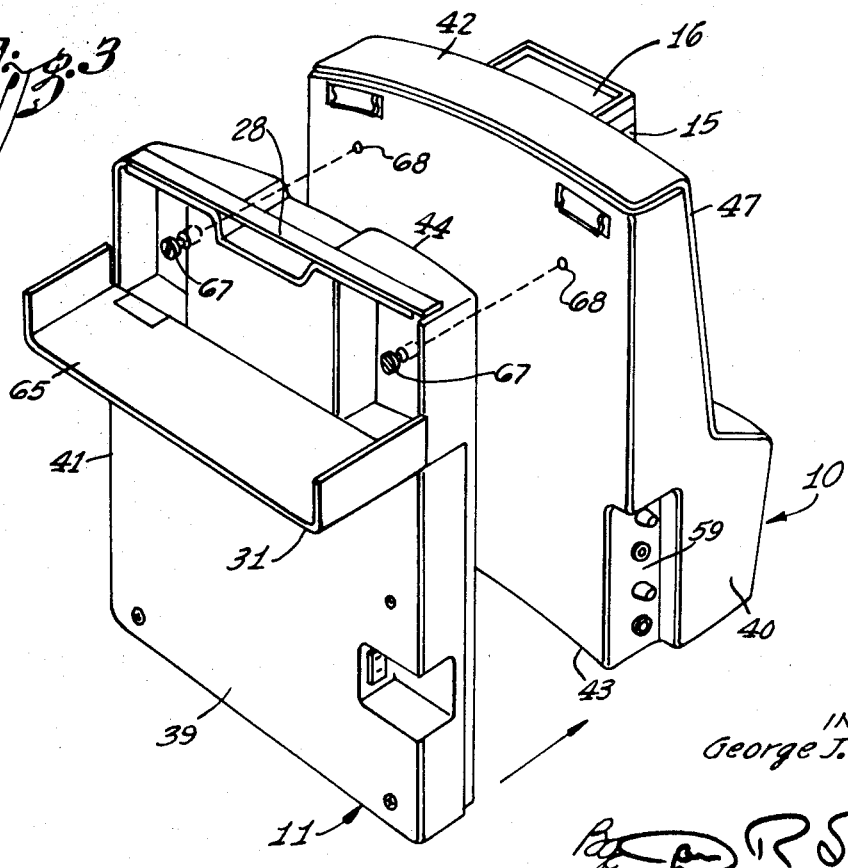

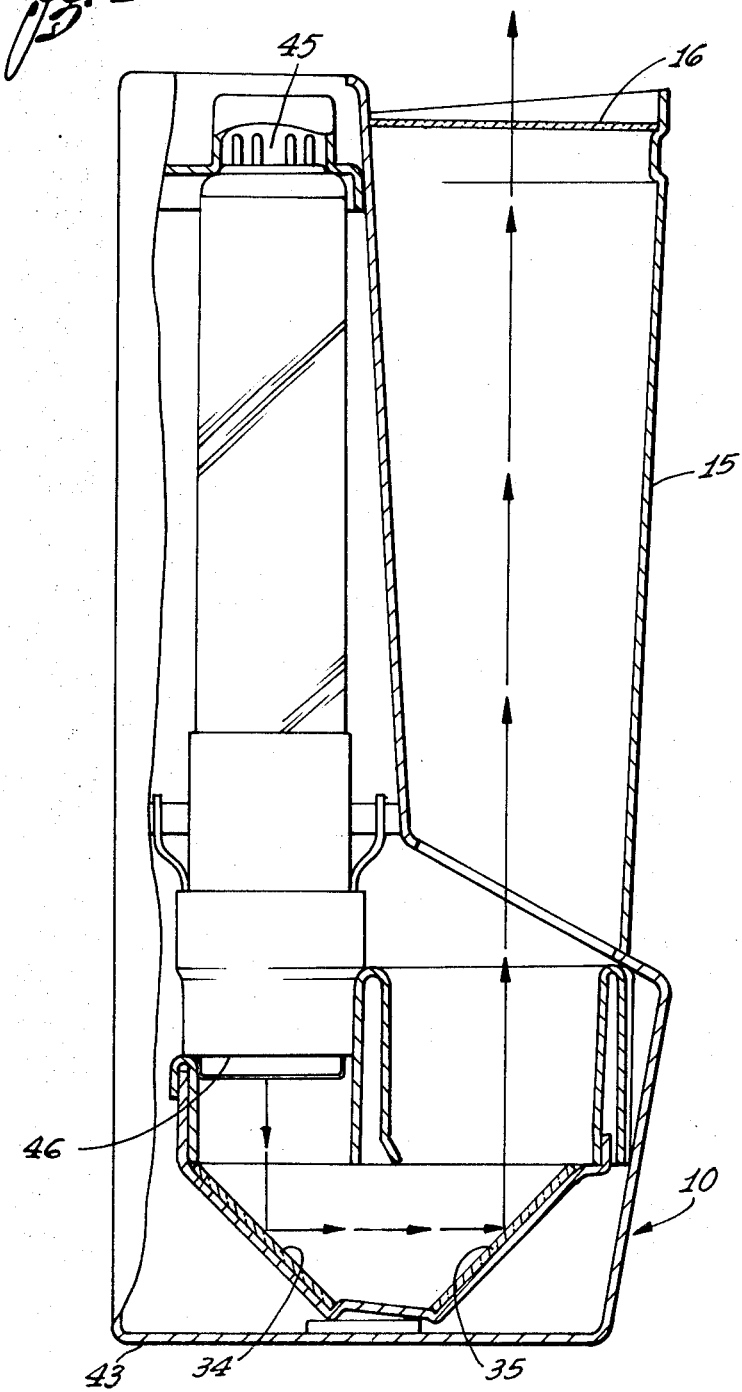

3,608,362
PORTABLE ELECTRONIC EQUIPMENT
George J. Chakar, Danbury, Conn., and Frederick L. Eberle, Hammond, and Bernard Ostrofsky, Gary, Ind.; said Chakar assignor to Automation Industries, Inc., Century City, Los Angeles, Calif.; said Eberle and Ostrofsky assignors to Standard Oil Company, Chicago, Ill.
Filed Apr. 3, 1969, Ser. No. 813,185
Int. Cl. G01n 24/00
U.S. Cl. 73—67.8                                5 Claims

ABSTRACT OF THE DISCLOSURE

A portable cathode ray oscilloscope type of equipment having a back pack containing a power supply and a chest pack containing operating controls and the display screen conveniently presented to the bearer for viewing and operation. The two packs are connected by shoulder straps for carrying. The oscilloscope is mounted with the screen facing downward, and is viewed through a light shield and double reflecting means.

BACKGROUND OF THE INVENTION

The present invention relates to portable electronic equipment and more particularly to a man-carried cathode ray tube display system wherein the electronics and display apparatus is carried on the chest and the power supply is carried on the back of the bearer.

Portable electronic equipment employing cathode ray tube displays heretofore known to the art have consisted of a back pack or a suitcase type of unit which must be placed on a stand to enable the operator to see the display and operate the controls. When such back pack or hand carried "suitcase" equipment must be carried into locations such as the interior of pressure vessels, through manholes, up and down ladders, and into hazardous locations, the bearer must carry the equipment with one hand, leaving only one hand for supporting himself. In the case of back pack equipment, the weight on the back of the wearer unbalances him and makes climbing difficult. Further, manholes in pressure vessels, etc., are usually quite small and barely large enough to admit a man. Thus, hand or back carrying electronic equipment through such restricted openings is difficult and hazardous.

SUMMARY OF THE INVENTION

The present invention obviates many of the difficulties and hazards of the portable equipment heretofore known. As applied to an ultrasonic nondestructive testing instrument, the electronics and display unit is carried on the chest, balanced by the power supply carried on the back of the bearer. Both hands of the operator are free for climbing, etc., and for operating the unit. The cathode ray tube display is placed far enough from the operator's eyes so that he has no difficulty focusing on the display. The tube is mounted with the screen facing downward and the screen is doubly reflected so that the display is erect, simplifying operator interpretation of the display. The primary controls are placed where they may easily be seen and operated, and the ultrasonic search unit may be easily handled by the operator in cramped, restricted quarters. It may be desirable under some circumstances to use the portable equipment placed on a table or bench. Connectors are provided enabling the two units to be locked together for laboratory use as a bench unit.

It is therefore an object of the present invention to provide portable cathode ray oscilloscope equipment which is compact and easily carried in restricted spaces.

Another object of the present invention is to provide a portable electronic instrument including a chest carried cathode ray tube display unit and a back carried power supply.

A further object of the present invention is to provide a chest carried cathode ray tube display unit having a screen which is readily visible and readable in bright light.

A still further object of the present invention is to provide a portable cathode ray tube display unit which is compact, easily carried, and readily operable in restricted quarters.

These and other objects of the present invention will become more apparent from the following specification and accompanying drawings.

BRIEF DESCRIPTION OF THE DRAWINGS

FIG. 1 illustrates an ultrasonic testing unit constructed in accordance with the present invention;

FIG. 2 illustrates the ultrasonic testing unit of the present invention when employed as a bench unit;

FIG. 3 illustrates the manner of combining the electronics and display unit and the power supply unit of the equipment for bench use; and FIG. 4 is a cross section taken through the electronics and display unit illustrating the manner of mounting the cathode ray oscilloscope tube for comfortable viewing of the screen.

DESCRIPTION OF THE PREFERRED EMBODIMENT

Referring to the drawings in more detail the present invention is embodied in an electronic assembly or instrument 8 adapted to be worn by the operator 9 or to be used on a bench in a conventional manner. The packaging of the instrument 8 is particularly arranged so as to not materially interfere with the freedom of movement of the operator 9 while he is wearing it. The instrument 8 may be subdivided into several subpackages. By way of example the present instrument is subdivided into a first or display unit 10 and a second or power supply unit 11.

The instrument 8 can be adapted for a wide variety of different applications. However, in the present instance it is designed to be used primarily as an ultrasonic nondestructive testing instrument. Such an instrument 8 normally utilizes a search unit 23 which is adapted to be coupled to the workpiece for transmitting ultrasonic energy into a workpiece and/or receiving ultrasonic energy therefrom. The instrument 8 is responsive to this energy and produces a display in the display unit 10 which indicates the thickness of the material, identifies hidden or internal defects, etc. Although the visual display may be produced by a meter, numerical tubes, etc., in the present instance a cathode ray tube 32 is used to provide an oscillogram. The present power unit 11 includes suitable batteries for operating the instrument 8 for an extended period of time. For example the batteries may last for 8 hours which corresponds to a normal workshift. By providing three power supplies 11 for each display unit 10, the display unit 10 can be continuously kept in operation 24 hours.

The power unit 11 preferably has one side 38 contoured to correspond to some portion of the operator's body for example his back.

The display unit 10 includes a case 17 which may be fabricated from any desirable material such as a lightweight durable plastic, for example, a laminated polyvinyl chloride. The case 17 includes a back 39, a pair of lateral sides 40 and 41 and a pair of ends 42 and 43. As will be explained in more detail the back 39 normally has a concave contour adapted to snugly fit onto or cmfortably mate with some part of the operator's body. In order to make the display unit 10 readily accessible this is noramlly contoured to the operator's chest. In addition the rear 44 of the power supply 11 is normally contoured to conform with the back 39.

When the display unit 10 is in an operative position on the operator, the back 39 is substantially vertical whereby the end 43 is the bottom of the pack and the other end 42 is the top.

The cathode ray tube 32 is disposed in the case 17 and mounted on the inside of the back 39. The tube 32 is in a vertical position with the plug end 45 in the upper position adjacent the top end 42. This places the face 46 of the tube 32 near the bottom end 43.

The various electronic components which are embodied within the instrument 8 are normally mounted in the case 17. They are preferably substantially equally divided on the opposite sides on the neck of the cathode ray tube 32. The particular components utilized in the instrument 8 are dependent upon the nature of the instrument 8 and how it is to be used. If, as in the present instance, the instrument 8 is of the ultrasonic nondestructive testing variety, it will normally include a transmitter or pulse generator. This is electrically coupled to the search unit 23 by means of the cable 24. This is effective to supply high voltage pulses to the search unit 23 so as to cause it to intermittently radiate pulses of ultrasonic energy into the workpiece. The search unit 23 is also coupled to a receiver which receives the electrical signals produced by the search unit as a result of echoes striking the search unit.

A sweep generator is coupled to the "horizontal" deflection means in the cathode ray tube 32. The sweep generator produces a wave form such as a sawtooth wave to sweep the beam "horizontally" across the face 46 of the tube 32. Normally the "horizontal" deflection or scan is parallel to the back. In addition, a vertical deflection amplifier is coupled to the "vertical" deflection means for controlling the position of the electronic beam in directions at right angles to the horizontal sweep, i.e., normal to the back 39.

The vertical deflection amplifier is coupled to the receiver so as to be responsive to the received signals. Each time an echo is received by the search unit 23 an electrical signal is created. This is received and amplified and fed to the deflection means in the cathode ray tube 32. As a consequence a "vertical" deflection will be produced in the oscillogram on the face 46 of the tube 32.

It can be appreciated that if the scanning produced by the sweep generator is a function of the velocity of the propagation of the ultrasonic energy through the workpiece, the "horizontal" displacement of the "vertical" markers will be positioned as a function of the distance to the reflecting surface causing the echo.

A cover 47 is mounted on the case 17 for enclosing and protecting the various electric components, the cathode ray tube, etc. Preferably the cover 47 is secured to the case 17 by means of a hinge 48 extending across the bottom 43. This will permit the cover 47 to be easily opened for servicing the various parts of the instrument 8.

In order to permit the operator to view the face 46 of the cathode ray tube 32, a window 16 is provided in the cover 47. Since in the present instance the tube 32 is directed downwardly, one or more reflecting surfaces such as a pair of distortion free mirrors 34 and 35 may be mounted on the case 17 in alignment with the face 46 of the tube 32 and the window 16. Light from the face 46 of the cathode ray tube 32 will be reflected up to the operator 9 whereby he can indirectly observe the oscillogram on the face 46 of the tube 32. It will be seen the optical distance from the operator's eyes to the face 46 of the tube 32 will be adequate to permit easy viewing.

Since the present instrument 8 is intended to be used outside in sunlight it has been found desirable to add a light shield 15 on the cover 47. This will screen the face 46 of the cathode ray tube 32 and permit easier viewing of the oscillogram in bright light. However, since the instrument 8 may be also used in darkness or inside buildings, it is desirable to make the shield 15 easily removable.

One or more control panels may be provided on the instrument 8 so as to permit the adjustment of the various functions. In the present instance, the main control panel 49 is formed on the cover 47 so as to be substantially equally divided on the opposite sides of the window 16. Normally the controls which are placed on this panel 49 are those most frequently adjusted or manipulated. By way of example, the sweep controls 50 may be grouped on the left side of the panel 49. These controls 50 would include a combination ON/OFF switch and course control 51, a fine control 52 and a delay control 53. In addition a battery indicator 54 may be provided whereby the operator may be aware of the condition of the power supply.

The opposite, or right hand portion of the panel 49 may include the sensitivity controls 55. By way of example, these may include a course attenuator control 56 (which functions in 10 DB steps), a medium attenuation control 57 (which would function in one DB step) and a reference control 58 (which functions as a continuous adjustment).

If additional controls are required, an open recess 59 may be formed in one or both of the sidewalls. In the present instance such a recess or pocket is formed in the lower portion of the right hand sidewall 40. This side control panel includes a pulse length control 61 and a three position mode selector switch 62. In addition jacks 63 and 64 may be provided for receiving the electrical cables 24 from the power supply search units 23, etc.

The pulse length control 61 is effective to adjust the transmitter so as to control the duration of the initial pulse which is transmitted by the search unit 23. The mode control switch 62 includes a "PE" or pulse echo position, a "THRU" or through transmission position and a "CALIBRATE" position. When the switch 62 is in the PE position the single search unit 23 is coupled into the instrument 8. When the switch 62 is in the THRU position a pair of search units are coupled to the instrument 8 for transmitting ultrasonic energy from one side of the workpiece to the other side.

When the switch 62 is in the CALIBRATE position a reference or calibrate device is coupled to the instrument 8 instead of search unit 23. This device includes a test block having a search unit or crystal transducer permanently bonded to the block. Each time the transmitter produces an electrical pulse the crystal transducer transmits a pulse of ultrasonic energy into the block. This pulse will be repeatedly reflected between the ends of the block whereby the crystal will produce corresponding echo signals. The length of the block is accurately precalibrated to correspond to a preselected thickness of test material. This in turn will produce a series of markers on the face 46 of the tube 32 corresponding to these dimensions. As a consequence the operator can align these markers with a graticle to insure proper calibration of the instrument.

Other controls which are not used very frequently may be mounted inside the case or cover or else they may be mounted on a top control panel 42. Preferably a cover 65 is hinged at the corners for swinging over these controls to conceal and protect them from inadvertent adjustment.

In order to utilize the present instrument 8 in the field it is normally worn by the operator 9. The shoulder strap storage doors 66 on the power supply unit 11 are opened and the two shoulder straps 12 are removed. The doors 66 are then closed and the straps 12 coupled between the power supply unit 11 and the display unit 10. The shoulder straps 12 may then be placed over the shoulders whereby the battery unit 11 is on the back of the operator and the display unit 10 is on his chest.

The shoulder straps 12 are adjusted to position both the power supply 11 and display unit 10 at a comfortable working position. Normally the bottom of the display unit 10 is at or above waist level. This permits ease of maneuverability and viewing without interfering with the operator 9 while he is climbing, etc. The side straps 13 and electrical cable 14 are next connected and adjusted.

The operator may then turn the instrument ON by the ON/OFF switch 51. As soon as the set 8 is warmed up and is functioning properly the operator may set the various controls, etc., so as to cause the instrument 8 to function properly for the test to be performed. Initially the calibration of the set is checked and adjusted as required. This is accomplished by placing the mode selector switch 62 in the CALIBRATE position. At this time the search unit 23 is disconnected but the transducer bonded to the test block is operative. Each time the transmitter produces a triggering pulse a series of echo pulses will be produced. Each one of these echoes is timed to correspond to a range of ½". The sweep generator is then adjusted to align the vertical marker corresponding to a desired echo with the desired marker on the graticle. For example, if the thickness to be measured is less than ½" the vertical blip would be aligned with the end of the graticle. However, if a thickness of up to one inch or two inches is to be measured then the sweep would be adjusted so that the corresponding vertical marker (i.e., the second or fourth) would be properly aligned with the end of the graticle. At this point the instrument 8 is all set to be used and the mode selector switch 62 is set to PE or THRU depending upon whether a pulse echo test or a through transmission test is to be made. The operator may then proceed to make an inspection by manipulating the search unit 23 across the workpiece while observing the display on the face of the cathode ray tube 32.

If the instrument 8 is to be used on a bench the various straps 12 and 13 may be disconnected and stored. The two units 10 and 11 may then be stood on end adjacent each other, similar to FIG. 3. They are then mated and the fastening bolts 67 are accessible through the strap storage doors 66 and extended into the aligned fasteners 68 on the display unit 10. They are then tightened to securely fasten the two units together.

While only a limited number of embodiments of the present invention are disclosed herein, it will be readily apparent to persons skilled in the art that numerous changes and modifications may be made thereto without departing from the spirit of the invention. Accordingly, the foregoing disclosure and description thereof are for illustrative purposes only and do not in any way limit the present invention which is defined only by the claims which follow.

What is claimed is:

1. A portable electric instrument including a first package containing power supply means; a second package containing electric circuit means, display means and control means; support means connecting said first package and said second package whereby said first package is adapted for being supported adjacent to a bearer's back and said second package is adapted for being supported adjacent to a bearer's chest; and means for applying electrical power from said first package to said second package; wherein said display means including:
   a cathode ray tube having a neck and a display screen end;
   means for mounting said cathode ray tube with the neck end adjacent to the top of said second package and said display screen end facing downward; and
   reflecting means adjacent to said display screen end for reflecting the display on said display screen upwards.

2. The instrument as defined in claim 1 wherein said second package further including a light shield extending upwards from said reflecting means and having an open end facing upwards.

3. In the combination of claim 2, said reflecting means including:
   a first mirror mounted at substantially a forty-five degree angle from the surface of said display screen end; and
   a second mirror adjacent said light shield mounted substantially perpendicularly to said first mirror, reflecting the display screen for viewing through the open end of said light shield.

4. The instrument as defined in claim 1 configured for ultrasonic nondestructive testing and inspecting of workpieces, said instrument further including:
   a search unit adapted for being coupled to said workpiece;
   transmitting and receiving means coupled to said search unit for transmitting ultrasonic energy into said workpiece and for receiving the echoes of energy received from the workpiece;
   means for coupling said cathode ray tube to said receiver; and
   a sweep generator coupled to said cathode ray tube for scanning an electron beam across the face of said tube whereby an oscillogram of the received signals is produced.

5. The instrument as defined in claim 4 further including:
   a reference block having a predetermined length;
   an ultrasonic crystal bonded to said block;
   means for coupling the ultrasonic crystal to said transmitting and receiving means, for transmitting pulses of ultrasonic energy through said block and receiving multiple echoes therefrom, whereby reference signals are displayed on the face of the tube; and
   means for adjusting the sweep generator to align the displayed reference signals with reference marks inscribed on the face of the tube.

References Cited

UNITED STATES PATENTS 2,458,771    1/1949    Firestone _____ 73—67.8

FOREIGN PATENTS 1,021,039    12/1957    Germany _____ 244—5–9

OTHER REFERENCES

Smith: "Stress-Induced Anistropy . . .", Ultrasonics, July 1963, pp. 138, 139.

Sams: "Using the Oscilloscope . . .", p. 228, 1961.

Automation Industries Bulletin UT–110, received P.O. October 1968, 5 p.

Branson: Inst., "Nondestructive Thk. Measurements," received P.O. January 1969, p. 8, 10–23.

RICHARD C. QUEISSER, Primary Examiner

A. E. KORKOSZ, Assistant Examiner